(12) United States Patent
Wilken et al.

(10) Patent No.: US 6,178,080 B1
(45) Date of Patent: Jan. 23, 2001

(54) RESETTABLE FAST CURRENT LIMITER IN TELECOMMUNICATIONS PROTECTION

(75) Inventors: Josh M. Wilken, Ft. Worth; John J. Napiorkowski, Irving, both of TX (US)

(73) Assignee: Siecor Operations, LLC, Hickory, NC (US)

(*) Notice: Under 35 U.S.C. 154(b), the term of this patent shall be extended for 0 days.

(21) Appl. No.: 09/383,657

(22) Filed: Aug. 26, 1999

(51) Int. Cl.⁷ .................................................... H02H 5/00
(52) U.S. Cl. ............................ 361/119; 361/58; 361/103; 361/93.1
(58) Field of Search ................................ 361/119, 127, 361/103, 56, 58, 111, 93.1

(56) References Cited
U.S. PATENT DOCUMENTS 4,907,120 * 3/1990 Kaczmarek et al. ................. 361/119

* cited by examiner

Primary Examiner—Stephen W. Jackson

(57) ABSTRACT

A device and method for providing overvoltage and overcurrent protection to equipment and personnel that come in contact with electrical lines, particularly telecommunications lines. The overvoltage protection is provided by connecting overvoltage protectors between conductors of the telecommunications line, or between each of the conductors and ground. The overcurrent protection is provided by solid-state bidirectional, resettable, fold-back type current limiters that limit maximum current flow at a predetermined level. These current limiters are arranged in line to the conductors of the telecommunications line and in series with equipment that are connected to the telecommunications line. The overvoltage protectors and the current limiters can be combined to form an integrated protection device, or they can be packaged as separate and distinct devices. The overvoltage and/or overcurrent protection schemes could be used at building entrance terminals, remote terminals, remote cabinets with electronics, in the central office at the main distribution frame, etc.

27 Claims, 5 Drawing Sheets

RESETTABLE FAST CURRENT LIMITER IN TELECOMMUNICATIONS PROTECTION

FIELD OF THE INVENTION

The present invention relates to current limiters and associated current and voltage protection devices in telecommunications, and more particularly, to a solid state current limiter that is resettable and exhibits a fast response.

BACKGROUND OF THE INVENTION

Wired telecommunications of today relies more and more on telephone lines to facilitate data and voice transmissions. From computer modems and fax machines to video players, the telephone line has played an important role in making the world smaller via telecommunications. Because of the proliferation of uses for telephone lines, there has been a growing concern to protect operating personnel and connected communications equipment from excessive voltages and currents that may occur on the lines, as typically caused by lightning strikes, power line crosses, and currents induced from adjacent power lines.

Primary telecommunications protectors, at a minimum, provide overvoltage protection. This is typically done with at least one protection element that is inserted between the tip and ring conductors of the telecommunications line and ground. When hazardous overvoltages are present on the line, these overvoltage protection elements change from a high impedance to a low impedance state, effectively shorting the hazardous overvoltages, and their associated overcurrents to ground and away from equipment and personnel. Once the hazardous overvoltage condition has subsided, these protection elements typically return to their original high impedance state. Some conventional overvoltage protection elements include thyristors, gas tubes, air-gaps, diodes, metal oxide varistors, and combinations of the above in various configurations to better provide overvoltage protection.

There are occasions when an excessive overcurrent may be present with no overvoltage. This is typically called a "sneak current" and may occur when there is AC induction on the line or somehow the tip and ring conductors are shorted or nearly shorted to ground. During such a condition the overvoltage protection element may not short to ground, thereby allowing hazardous overcurrents to pass by the protector to the equipment and personnel inside the house, building, or remote cabinet. This condition may damage telecommunications equipment over time or may cause a fire hazard. Current methods of stopping or diverting sneak currents and overcurrents in telecommunications applications typically employ heat coils or Positive Thermal Coefficient (PTC) elements. A heat coil typically comprises resistive elements that are connected in series with the wires of the line. When a sustained overcurrent exists, the heat caused by $I^2R$ activates a thermally sensitive shorting mechanism, thereby permanently shunting current to ground and diverting such current away from the connected equipment and personnel. A PTC element also performs the function of sensing current on the line, however, it often prevents an overcurrent by switching into a high-resistance mode to stop the current from flowing as opposed to grounding the line, and thereby creating an open circuit upon reaching a predetermined overcurrent-induced temperature threshold.

While heat coils and PTC devices have proven to protect telecommunications lines from extended overcurrents of a certain magnitude, they are not true "current limiters," instead they limit the duration an overcurrent is allowed to exist on a line. In the case of heat coils, the existence of an overcurrent on the line may result in excessive heat buildup on the line and can actually cause a fire. Furthermore, because heat coils and PTC elements are thermal devices, they are sensitive to ambient temperatures and can be slow to operate. Of the two types, only PTC elements are self-resetting. They often require many seconds to operate, and depending on the magnitude and duration of the current surge, they normally require just as long to return to a low resistance state, thereby disturbing customer services for much longer than the actual overcurrent duration. Heat coils by nature of design also take several seconds to minutes to operate and are not resettable; therefore, they are ineffective against current surges, and they further disturb customer services after operation until they are replaced. Accordingly, a need exists for a reliable and fast automatically-resetting protection arrangement in telecommunications applications.

SUMMARY OF THE INVENTION

The proposed protection device and method replace the heat coils or PTC elements with a solid-state current limiter in novel arrangements with connected equipment to provide a much faster operating time, reduced temperature sensitivity, and a much faster reset time. The solid-state current limiter may also work in conjunction with an existing heat coil or PTC scheme to provide an added level of protection to overcurrents in the telecommunications line. In addition, the solid-state current limiter truly limits the current to a specified value, as opposed to severing the telecommunications line, to protect connected equipment and personnel. The solid-state current limiter also provides immediate reaction to an overcurrent condition, and reset just as fast once the overcurrent condition has subsided. Consequently, operating and reset times can be measured in microseconds, thereby not allowing a hazardous overcurrent into the house, building, or remote cabinet and greatly reducing the time customer service is disrupted. Furthermore, because the solid-state current limiter of the present invention is not a thermal device, it is relatively insensitive to temperature changes, and therefore may be used in environments where extreme temperatures may exist.

In operation, the current limiter of the present invention is a fold-back type, which decreases the amount of current throughput as current demand increases beyond a predetermined limit. A current limiter of this type greatly reduces risk to customers and equipment, and reduces service calls and complaints due to sneak currents and overcurrents. This type of fold-back current limiter eliminates the possibility of burnout due to excessive power dissipation. This product potentially could be used in Central Office, Remote Terminal, Building Entrance Station Protection, secondary telecommunications protection, electronics, and computer overcurrent protection.

According to an embodiment of the present invention, a protection arrangement comprises an electrical line having at least two conductors coupled to a first equipment to provide electrical signals to the first equipment, a first primary overvoltage protector having a first end coupled to a first conductor of the electrical line, a first resettable solid-state current limiter arranged in line to the first conductor of the electrical line to provide overcurrent protection to the first equipment, a second resettable solid-state current limiter arranged in line to a second conductor of the electrical line to provide overcurrent protection to the first equipment.

According to another embodiment of the present invention, a method for providing overcurrent protection to equipment connected to conductors of a telecommunications line, comprising the arrangement of a first solid-state current limiter in line to a first conductor of the telecommunications line and in series with the equipment, and the arrangement of a second solid-state current limiter in line to a second conductor of the telecommunications line and in series with the equipment.

Therefore, from the foregoing, it is a general object of the present invention to provide a novel device and method for providing overvoltage and/or overcurrent protection to equipment and personnel that come in contact with electrical lines, particularly telecommunications lines. Other and further objects, features, and advantages of the present invention will be readily apparent to those skilled in the art when the following description of the preferred embodiment is explained in conjunction with the accompanying drawings.

DETAILED DESCRIPTION OF THE INVENTION

Figure 1:
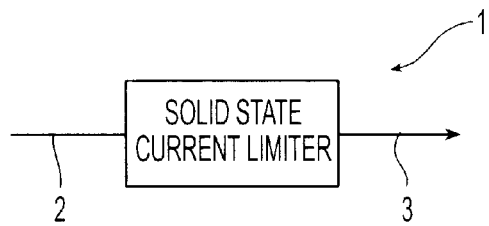
FIG. 1 is a schematic representation of a solid-state current limiter for use in accordance with an embodiment of the present invention.
Figure 2:
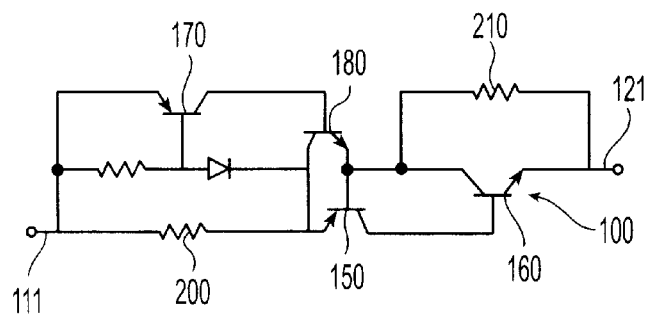
FIG. 2 is an electrical schematic representation of a prior art solid-state current limiter.

Referring to FIG. 1, the solid-state current limiter in its simplest form would come in a two-conductor package 1 having an input conductor 2 and an output conductor 3. Circuit designs of the current limiter represented by package 1 are commonly found in the art. For example, FIG. 2 shows a solid state interrupt circuit 100 that acts as resettable current limiter for circuit protection as disclosed in U.S. Pat. No. 4,530,023 (BROWN), which is incorporated by reference and briefly explained here. The current limiter 100 has two pairs of transistors 150, 160 and 170, 180 that are connected in SCR configurations to serve as a first thyristor and a second thyristor. The current limiter is connected in series between the power source and the load to be protected and has an initial low impedance state and a predetermined maximum allowable throughput current set by the value of resistor 200. When the input current is greater than the maximum allowable current, circuit 100 switches to a high impedance state due to the actions of the formed thyristors, and current flow is greatly reduced; wherein the high impedance state can be predetermined by setting a high ohmic value for resistor 210.

Figure 3:
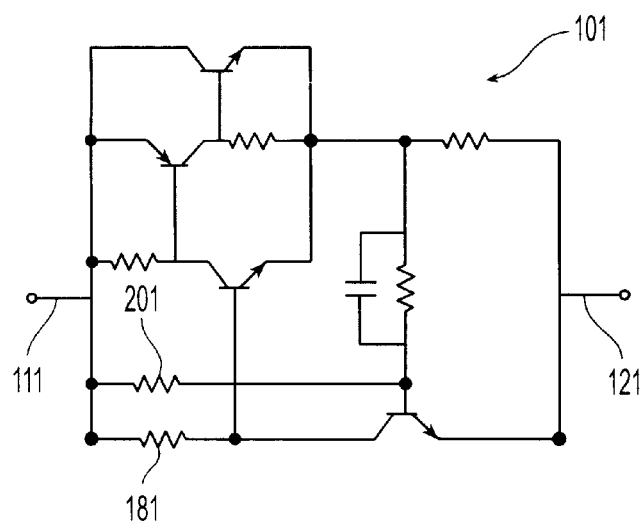
FIG. 3 is an electrical schematic representation of a prior-art fold-back type current limiter.
Figure 4:
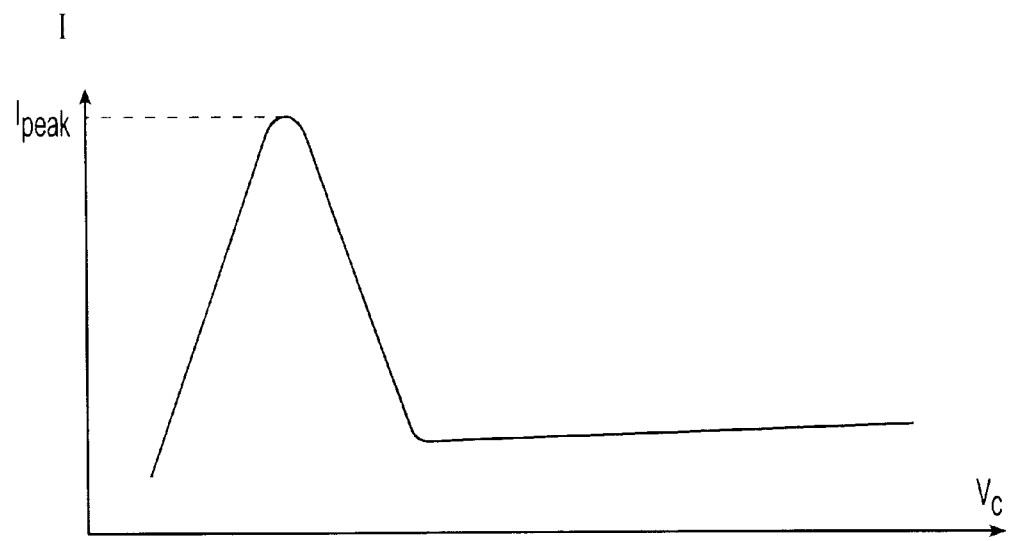
FIG. 4 is a waveform diagram of the current flow through the current limiter of FIG. 3 and the current limiting action imposed on such current flow by the current limiter.

FIG. 3 shows another resettable current limiter 101 as disclosed in U.S. Pat. No. 4,271,448 (POND) and hereby incorporated by reference. This resettable current limiter is of a fold-back type, which allows the current limit not to be fixed; rather, such limit depends on the voltage drop across the current limiter. As the overload condition increases, the voltage drop across the current limiter increases but the current through the current limiter is initially limited to a maximum current value and then it is subsequently decreased. With this arrangement, not only is the current limited but the power dissipation and the associated heat generation are also limited. Hence, according to one embodiment of the present invention, a fold-back type current limiter is arranged in a novel manner to protect personnel and equipment that are in contact with the telecommunications line. Referring now to FIG. 3, the fold-back type current limiter 101 has an input terminal 111 and an output terminal 121 and would be connected in series between the power source and the load to be protected. It has a normal low impedance state and a predetermined maximum allowable throughput current set by the value of resistor 181. When the current flowing through the current limiter, and through equipment electrically connected in series with it, is greater than the maximum allowable current, the current limiter switches to a circuit protection high impedance state to limit the current flow. The high impedance state is set by the value of resistor 181 in parallel with resistor 201. FIG. 4 shows the characteristics of the fold-back type current limiter 101. If the voltage across terminals 111 and 121 continues to increase as a result of an overcurrent or a sneak current, the current flowing through the circuit is first set to the maximum value $I_{peak}$ and subsequently folds back in value. As a consequence, further increases in voltage across the current limiting circuit results in only small increases in the current flow.

The current limiters in both BROWN and POND, as understood by one of ordinary skill in the art, can be fully fabricated in solid state. They have fast response times and automatic resettability, which are desired for the protection of personnel and equipment that are in contact with the telecommunications line. According to various novel embodiments of the present invention, one or more solid-state current limiters, such as those shown in BROWN and POND, are arranged in line with the telecommunications lines and in electrical series with equipment that are connected to the telecommunications lines. The current limiter is resettable and has an operating time that is preferably less than one millisecond, and it is fabricated with material that can withstand from 350 volts to 600 volts. It also has a desired operating impedance (not over-current condition on the line) of 10 ohms or less, and preferably 5 ohms or less, to be acceptable for typical telecommunications equipment, and it limits current flow to between 130 mA and 170 mA, as often needed to drive typical telecommunications equipment. Furthermore, the current limiter provides circuit protection bidirectionally. The above desired ranges of operating impedance and maximum current flow for a current limiter, such as those shown in BROWN and POND, can be achieved by setting appropriate values for the various elements in those circuits. Additionally, although the circuits shown in BROWN and POND are unidirectional, a bidirectional circuit can be obtained from a unidirectional circuit by adding a second unidirectional circuit in parallel with and in a back-to-back configuration with the first unidirectional circuit. Novel arrangements of one or more of the above resettable, bidirectional, fold-back type current limiters to provide protection to connected equipment are now described.

Figure 5:
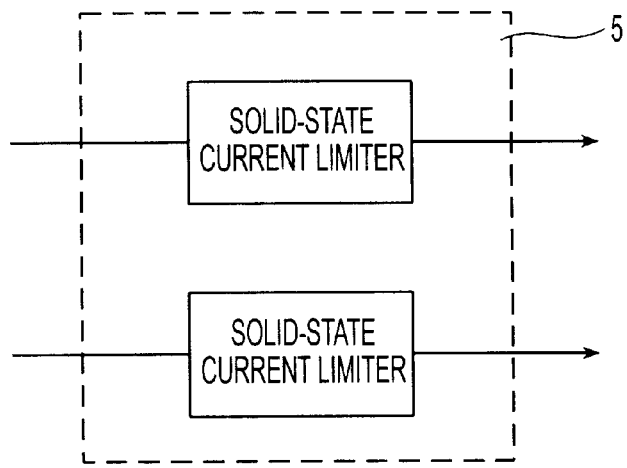
FIG. 5 is a schematic representation of a current limiter package for use in accordance with an embodiment of the present invention.

Referring back to FIG. 1, a complete sneak-current protector would require two such current limiter packages, one for each of the tip and ring conductors that make up the twisted copper pair commonly used for a telecommunications line, such as a telephone subscriber line. FIG. 5 shows a four-conductor package 5 as another possibility. This type of package would contain two solid-state sneak-current limiters in one package, and may be easier to implement into various configurations. Indeed, this type of package is ideal for twisted pair communications lines, and it would occupy a minimal volume and be environmentally sealed.

Another possible scheme is to integrate all overvoltage and overcurrent protection components into a single package, which greatly simplifies protector product assemblies. Such a package would have five contacts as typically found in the standard 5-pin, 4-pin, and 1-pin overvoltage/overcurrent protection modules. These standard types of protectors are used commonly throughout North America, Mexico, and South America in locations where pair counts are high and/or a high density is required (25 pairs or more at a single location). These protection modules serve to provide continuity between the outside plant and equipment and to protect the equipment and personnel from hazardous overvoltages that may come in contact with the telecommunications line.

As commonly known in the art, a 5-pin module or connector comprises five male contacts for tip in and out, ring in and out, and ground; a 4-pin module comprises four male pins for tip in and out, ring in and out, wherein the ground contact is located on the side of the module; and a 1-pin module actually comprises 4 female contacts for tip in and out, ring in and out, and a male contact for ground. The 5-pin module is most common throughout the United States, the 4-pin module is most common throughout Canada, and the 1-pin module is most common throughout Mexico and South America, although some of every type of protector can be found in any region.

Figure 6:
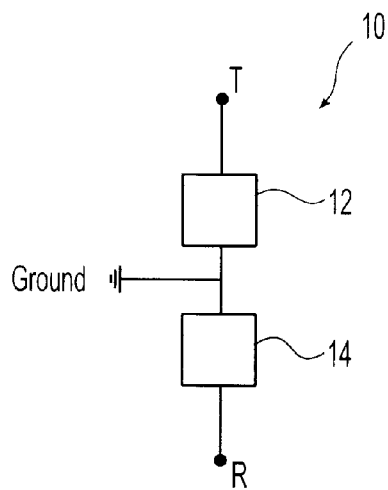
FIG. 6 is an electrical schematic of a typical overvoltage-only station protection module.
Figure 7:
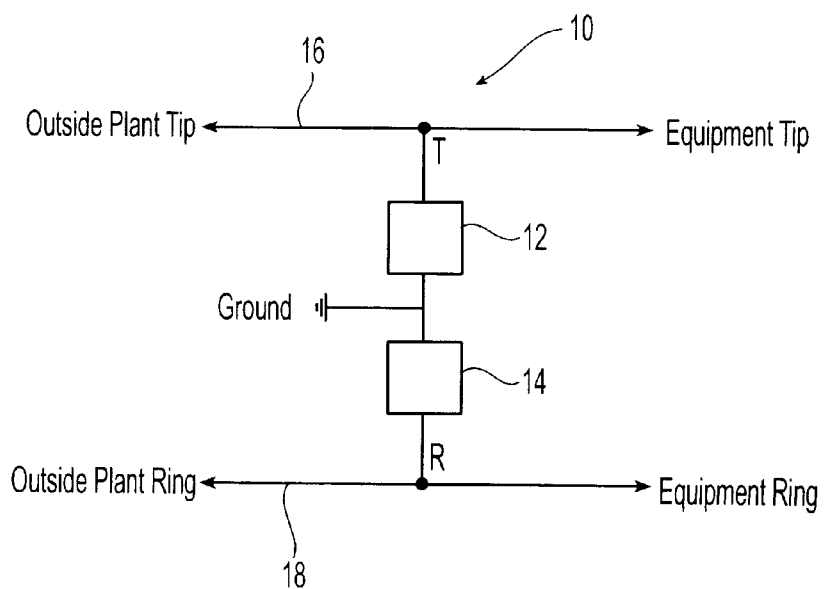
FIG. 7 is an electrical schematic of a typical application of the overvoltage-only protection module of FIG. 6 to a telecommunications line.

An integrated overvoltage and overcurrent protection scheme according to one embodiment of the present invention will now be described. Referring to FIG. 6, an electrical schematic of a typical overvoltage only protection module 10 for telecommunications comprises a tip terminal T and a ring terminal R, with the tip terminal being at the more positive voltage potential, and overvoltage protection elements 12 and 14 inserted between these terminals and ground. Some overvoltage protection elements may include thyristors, gas tubes, air-gaps, diodes, metal oxide varistors, or any combinations thereof. FIG. 7 is an electrical schematic showing an application of the protection module 10 to a telecommunications line, wherein its tip and ring terminals are in turn connected respectively to the tip and ring conductor wires 16 and 18 of the telecommunications line. It should be noted that the electrical protection module 10 can be incorporated into a standard 5-pin, 4-pin, or 1-pin type protector or a station protector, and the electrical schematic in FIG. 7 would remain the same.

Figure 8:
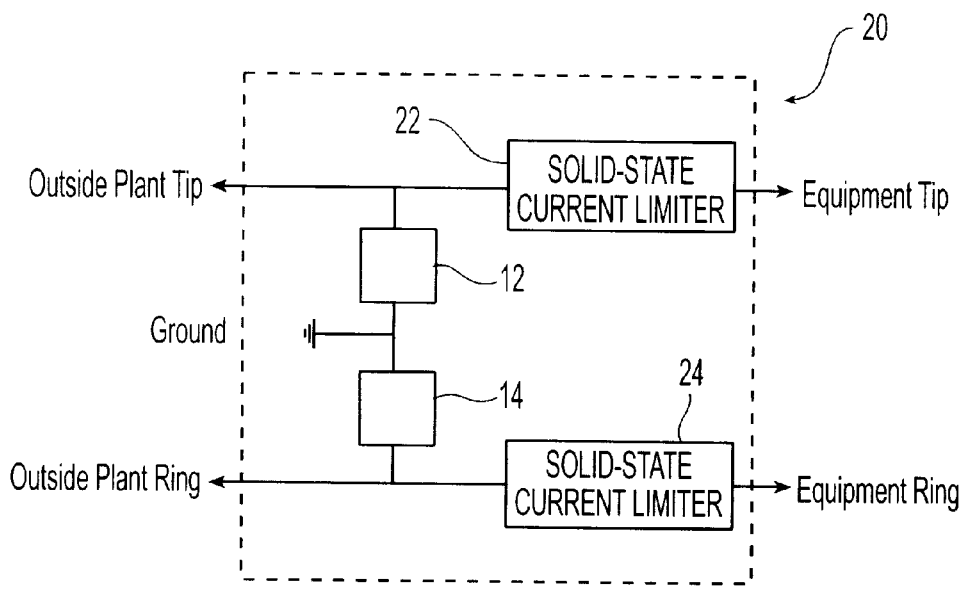
FIG. 8 is an electrical schematic of an arrangement of solid-state current limiters on the telecommunications line in accordance with one embodiment of the present invention.

Referring now to FIG. 8, according to one embodiment of the present invention, solid-state current limiters are integrated into the design of a standard 5-pin, 4-pin, or 1-pin overvoltage protector or a station protector to devise an efficient and effective overvoltage and overcurrent protector 20. Here, solid-state current limiters 22 and 24 are connected in-line like PTCs, and instead of shorting to ground or causing a high-impedance condition on the line like heat coils or PTCs, they would simply limit the current to a predetermined level. Thus, integrated 5-pin, 4-pin, or 1-pin protectors having solid-state current limiters can be installed in connector equipment found on the main distribution frame (MDF) in the telecommunication company's (telco) central office, and they would replace the conventional protectors having PTCs or heat coils in such equipment.

Applications for the solid-state current limiters are not limited to protection on the MDF. They also can be applied to building entrance terminals (BETs), i.e., station protectors found at the customer station. These type of protectors are most often used in locations where pair counts are low (25 pair and below), where exposure to overvoltages are high, and/or where better environmental immunity is required. FIG. 6 also represents the electrical schematic for most 3-terminal station protection modules. These protectors are typically installed in an enclosure found on the outside or just inside the customer premises. For example, in a business subscriber application, a BET typically comprises a single network interface device (NID) box for an apartment or business building with many station protectors placed inside it. In a single residence subscriber application, a station protector is also typically found in a NID box located on a side of the residential home, where the telecommunications line drop is located.

Figure 9:
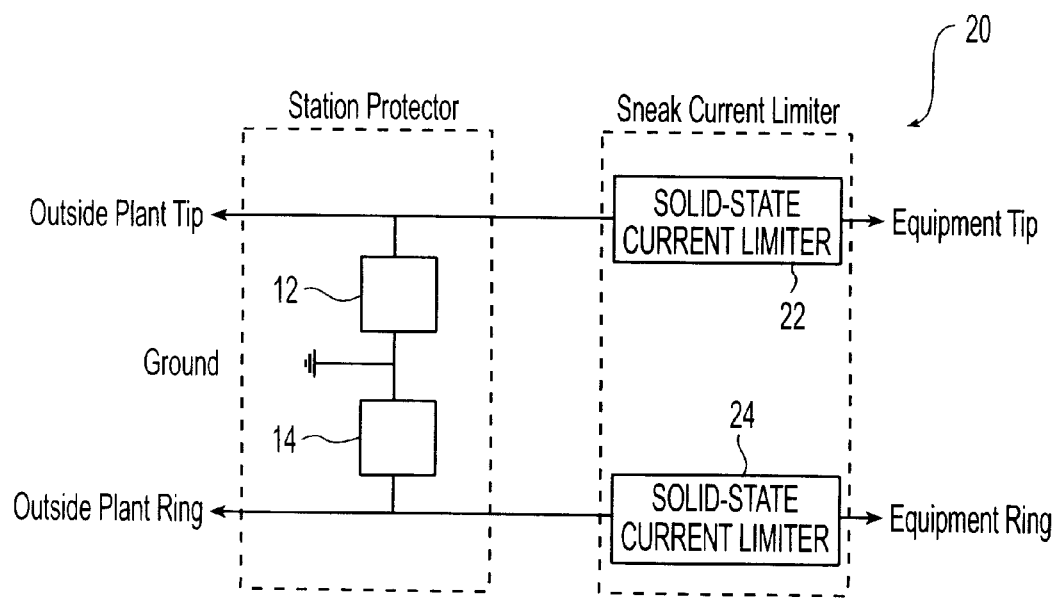
FIG. 9 is an electrical schematic of an arrangement of solid-state current limiters on the telecommunications line in accordance with another embodiment of the present invention.

These station protectors serve the same purpose as other overvoltage protection products, and because of the inadequacies of PTCs and heat coils they are not typically available with sneak current protection. Thus, according to another embodiment of the present invention, the solid-state current limiter can be installed into a station protector, so that the integrated station protector now becomes a 5-terminal device like the MDF protector shown in FIG. 8, as opposed to a 3-terminal device in a conventional station protector. The solid-state current limiter can also be inserted as a separate series element between the station protector and the equipment, as shown in FIG. 9, and it also would be located in an enclosure found at customer premises, such as in a NID in the case of telephone service for residential and business customers.

Figure 10:
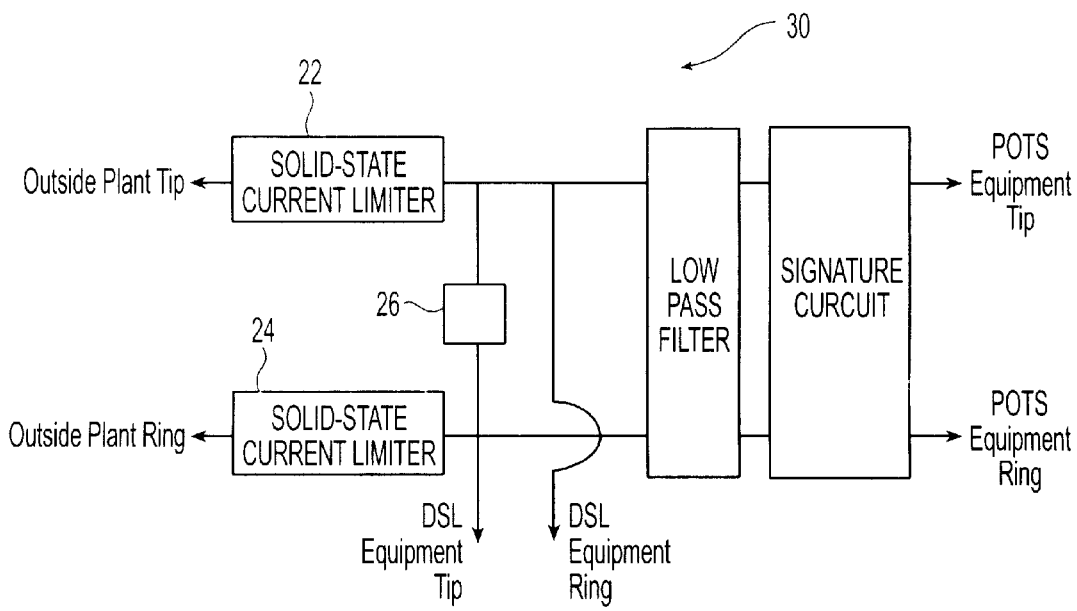
FIG. 10 is an electrical schematic of an arrangement of solid-state current limiters on the telecommunications line for use with an xDSL-POTS splitter.

Referring to FIG. 10, another application for the solid-state current limiter of the present invention is as a replacement for fuses in a digital subscriber line (xDSL)—plain old telephone service (POTS) splitter in a telecommunications line for a business or residential subscriber. The xDSL utilizes a higher frequency than the POTS, and it is typically used for high speed internet access, voice over IP, video on demand, or CATV signals. As shown FIG. 10, solid-state current limiters 22 and 24 are series elements arranged at the tip-ring input terminals of the xDSL-POTS splitter to protect the rest of the splitter circuitry from sneak current, and there is also a board level overvoltage protector 26 connected tip to ring.

Figure 11:
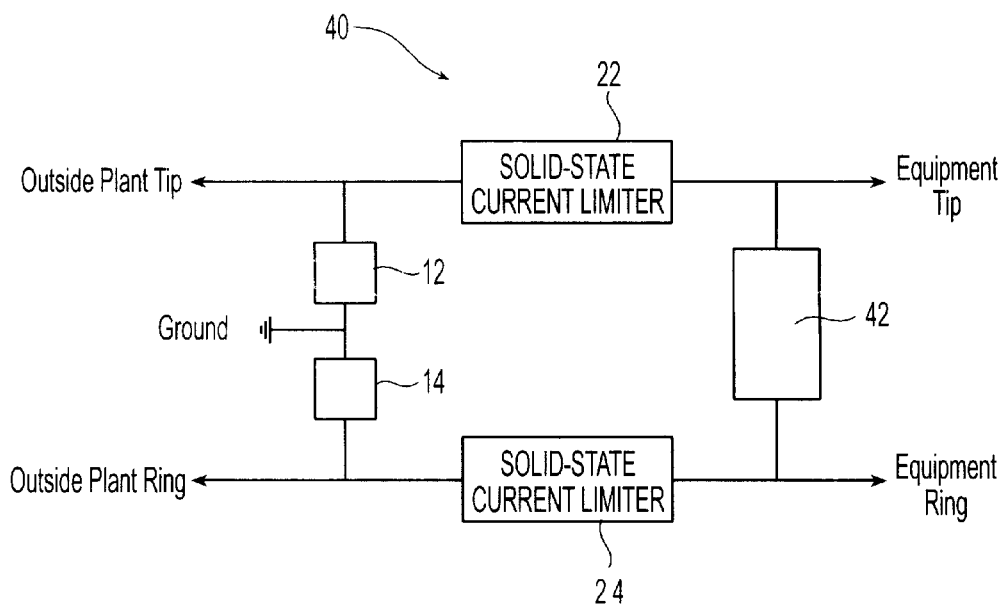
FIG. 11 is an electrical schematic of an arrangement of solid-state current limiters on the telecommunications line for secondary protection applications.

Other applications for the solid-state current limiter of the present invention include as a separate device which can be installed in series with the customer wiring via a standard telco jack, such as RJ-11 or RJ-14, and plug arrangement for connection in series with telecommunications equipment to be protected; as an addition to a DSL micro-filter, which would be very similar to the standard telco jack and plug arrangement; or as a replacement for fuses or as an addition into existing telecommunications equipment such as modems, network cards, fax machines, telephones, answering machines, caller ID devices, and video players. FIG. 11 shows a schematic diagram for these applications. Here, the primary overvoltage protection elements 12 and 14 would typically be the overvoltage station protectors provided by the telecommunications provider. According to this arrangement, the solid-state current limiters 22 and 24 can be connected in series with the customer's telecommunications equipment, which may also have a built-in secondary overvoltage protector 42 connected from tip to ring of the equipment to reduce any voltage peaks to a lower level. This current limiting, double-overvoltage protection arrangement is an ideal scheme to protect equipment. Furthermore, the solid-state current limiters 22 and 24 and the secondary overvoltage protector 42 may be packaged to form an integrated protection device located either within the telecommunications equipment or outside and in series with the equipment Likewise, the solid-state current limiters 22,24 and the primary overvoltage protection elements 12,14 may be packaged to form an integrated protection device that is located outside of the equipment to be protected.

Aside from the MDF and customer station applications mentioned above, a protector with a solid-state current limiter could be used to protect other locations, such as remote terminals, remote cabinets with electronics, transmission amplifiers in the outside plant, or sensitive electrical components insider computers and other electronics devices in electrical schemes similar to those shown above, as can be readily ascertained by one skilled in the art.

Although the solid-state current limiter of the present invention has been discussed thus far with regard to standard 5-pin, 4-pin, and 1-pin protection modules, station protectors, and their applications above, it is understood by one skilled in the art that the present invention can be modified to directly accommodate other types of connector or module configurations for other telecommunications protection applications as well. Therefore, while the invention has been described with reference to the above preferred embodiments, other embodiments can achieve the same results. As such, variations and modifications of the present invention will be apparent to one skilled in the art and the following claims are intended to cover all such modifications and equivalents.

What is claimed is:

1. A protection arrangement comprising:
    an electrical line having at least two conductors coupled to a first piece of equipment to provide electrical signals to the first equipment;
    a first primary overvoltage protector having a first end coupled to a first conductor of the electrical line;
    a first resettable solid-state current limiter arranged in series with the first conductor of the electrical line to provide overcurrent protection to the first equipment;
    a second resettable solid-state current limiter arranged in series with a second conductor of the electrical line to provide overcurrent protection to the first equipment;
    wherein the first resettable solid-state current limiter and the second resettable solid-state current limiter each have an operating time less than about 10 milliseconds.

2. The protection arrangement as recited in claim 1, wherein the electrical line comprises a telephone line; and wherein the first conductor is a tip conductor of the telephone line, and the second conductor is a ring conductor of the telephone line.

3. The protection arrangement as recited in claim 1, wherein the first primary overvoltage protector further has a second end coupled to the second one of the conductors of the electrical line.

4. The protection arrangement as recited in claim 1, further comprising a second piece of equipment coupled to the first and second resettable solid-state current limiters and in parallel with the primary overvoltage protector.

5. The protection arrangement as recited in claim 4, wherein the first equipment receives analog signals from the electrical line at a first frequency, and the second equipment receives digital signals from the electrical at a second frequency higher than the first frequency.

6. The protection arrangement as recited in claim 5, wherein the first primary overvoltage protector has a second end coupled to the second conductor of the electrical line.

7. The protection arrangement as recited in claim 1, further comprising:
    a second primary overvoltage protector coupled between ground and the second conductor of the electrical line.

8. The protection arrangement as recited in claim 7, further comprising:
    a secondary overvoltage protector coupled to the first and second resettable solid-state current limiters and coupled in parallel to the first equipment.

9. The protection arrangement as recited in claim 8, wherein the secondary overvoltage protector and the resettable solid-state current limiters form an integrated protection device.

10. The protection arrangement as recited in claim 9, wherein the integrated protection device is a part of the first equipment.

11. The protection arrangement as recited in claim 9, wherein the integrated protection device is external to the first piece of equipment.

12. The protection arrangement as recited in claim 8, wherein the secondary overvoltage protector is a separate protection device from the resettable solid-state current limiters.

13. The protection arrangement as recited in claim 7, wherein the first primary overvoltage protector is coupled between ground and the first one of the conductors of the electrical line.

14. The protection arrangement as recited in claim 13, wherein the arrangement provides protection on a main distribution frame (MDF), andwein the MDF comprises the first piece of equipment.

15. The protection arrangement as recited in claim 13, wherein the arrangement provides protection at a building entrance terminal to subscriber of a service provided by the electrical line.

16. The protection arrangement as recited in claim 7, wherein the primary overvoltage protectors and the resettable solid-state current limiters form an integrated protection device external to the first equipment.

17. The protection arrangement as recited in claim 1, wherein the first and the second resettable solid-state current limiters are capable of withstanding voltages in a range of 350 volts to 600 volts.

18. The protection arrangement as recited in claim 1, wherein the resettable solid-state current limiters exhibit operating impedances of 10 ohms or less.

19. The protection arrangement as recited in claim 18, wherein the resettable solid-state current limiters exhibit operating impedances of 5 ohms or less.

20. The protection arrangement as recited in claim 1, wherein the solid-state current limiters set a maximum current flow to the first piece of equipment at less than 170 mA.

21. The protection arrangement as recited in claim 1, wherein the resettable solid-state current limiters are fold-back type current limiters.

22. A method for providing overcurrent protection to equipment connected to conductors of a telecommunications line, comprising:
- coupling a first primary overvoltage protector having a first end to a first conductor of the telecommunications line;
- arranging a first solid-state current limiter in series with the first conductor of the telecommunications line and in series with the equipment; and
- arranging a second solid-state current limiter in series with a second conductor of the telecommunications line and in series with the equipment;
- wherein the first solid-state current limiter and the second solid-state current limiter each have an operating time less than about 10 milliseconds.

23. The method for providing overcurrent protection as recited in claim 22, wherein each of the solid-state current limiters is of a resettable, bidirectional, and fold-back type.

24. The method for providing overcurrent protection as recited in claim 23, wherein the solid-state current limiters are capable of withstanding high voltages in a range of 350 volts to 600 volts.

25. The method for providing overcurrent protection as recited in claim 24, wherein the solid-state current limiters exhibit operating impedances of 10 ohms or less.

26. The method for providing overcurrent protection as recited in claim 25, wherein the solid-state current limiters exhibit operating impedances of 5 ohms or less.

27. The method for providing overcurrent protection as recited in claim 26, wherein the solid-state current limiters set a maximum current flow to the equipment at 170 mA or less.

* * * * *